United States Patent
Philbin et al.

[11] Patent Number: 5,852,080
[45] Date of Patent: Dec. 22, 1998

[54] HOT MELT ADHESIVES WITH COMPATIBLE HYDROXYL-CONTAINING ESTER WAXES

[75] Inventors: Michael T. Philbin, Hopewell; Robert L. Billmers, Stockton; Charles W. Paul, Madison, all of N.J.

[73] Assignee: National Starch and Chemical Investment Holding Corporation, Wilmington, Del.

[21] Appl. No.: 901,305

[22] Filed: Jul. 28, 1997

[51] Int. Cl.$^6$ .............................. C08K 5/10; C08K 5/09; C08L 51/00; C08L 3/06
[52] U.S. Cl. ............................ 524/51; 524/317; 524/320; 524/504
[58] Field of Search ............................. 524/51, 317, 320, 524/504

[56] References Cited

U.S. PATENT DOCUMENTS

| | | | |
|---|---|---|---|
| 3,793,065 | 2/1974 | Morrison et al. | 428/392 |
| 3,891,584 | 6/1975 | Ray-Chaudhuri et al. | 524/504 |
| 5,360,845 | 11/1994 | Billmers et al. | 524/51 |
| 5,434,201 | 7/1995 | Neigel et al. | 524/51 |

FOREIGN PATENT DOCUMENTS

| | | | |
|---|---|---|---|
| 1416571 | 8/1988 | U.S.S.R. | 40/7 |

OTHER PUBLICATIONS

CA 104(26):22667A/AU 547024 Oct. 3, 1985 Australia.
CA 83(24):195126q/BE 821997 Mar. 3, 1975 Belgium.
CA 109(24):212634d/EP 278582 Aug. 17, 1988 European.
CA 86/(4):18305p/GB 1444498 Jul. 28, 1976 Great Britain.
CA 86(16):107954S/NL 7414632 Nov. 8, 1974 Netherlands.

*Primary Examiner*—Peter A. Szekely
*Attorney, Agent, or Firm*—Eugene Zagarella, Jr.

[57] ABSTRACT

Hydroxyl-containing ester or acid waxes useful in hot melt adhesives to provide compatible compositions with good thermal stability and color retention are disclosed and have the formula:

$$R(OH)_n COOR^1$$

where R is a hydrocarbon group of 12 to 30 carbons, n is 2 to 6 and R is H, $C_1$ to $C_4$ alkyl group or $(CH_2CH_2O)_x H$ where x is 1 to 4.

20 Claims, No Drawings

HOT MELT ADHESIVES WITH COMPATIBLE HYDROXYL-CONTAINING ESTER WAXES

BACKGROUND OF THE INVENTION

This invention relates to hot melt adhesive compositions, particularly starch based compositions or graft copolymers of vinyl monomers and polyalkylene oxide polymers, which further comprise compatible hydroxyl-containing ester or acid waxes.

Hot melt adhesives are bonding agents which achieve a solid state and resultant strength by cooling as contrasted with other adhesives which set or harden by chemical reaction or loss of solvent or water vehicle. Prior to heating, the hot melt adhesive is a thermoplastic material in the form of a 100% by weight solid and contains no volatile solvents. Application of heat melts the adhesive to a liquid or fluid state so it can be readily applied to a substrate. After removal of heat, the adhesive returns to the solid state by simple cooling.

Historically, hot melt adhesives have been based on synthetic and natural resins and waxes, particularly petroleum derived polymers such as polyethylene, ethylene-vinyl acetate, styrenic block copolymers, and polypropylene to name a few. These compositions are further tackified, plasticized and reinforced with a variety of resins, oils and waxes which are derived from both petroleum and naturally occurring feedstocks such as wood, gum and tall oil rosin and terpenes.

Attempts to find adhesives which were not based on petroleum derived raw materials have led to the exploration of starch as a source for use in hot melts. This stems from the well known use of starch as an adhesive in aqueous systems. However, the ability to find a starch material that could be used as the base or functional material in a hot melt was not easy since starch will normally not melt in the absence of water or solvent.

Recently, in U.S. Pat. No. 5,360,845 issued Nov. 1, 1994, a hot melt adhesive composition using a selected intermediate or high DS starch ester as the base or main adhesive component was disclosed. The selected starch ester is used in the hot melt formulation in combination with a non-volatile, organic diluent as well as optional additives such as tackifiers, antioxidants, plasticizers and waxes.

Waxes have been used in various hot melt adhesives to reduce melt viscosity or alter the cohesive characteristics without appreciably decreasing bond strength. However, the use of waxes in some hot melt formulations, particularly those involving starch based compositions and graft copolymers of vinyl monomers and polyalkylene oxide polymers have generally resulted in compatibility and thermal stability problems as well as poor color retention.

SUMMARY OF THE INVENTION

Now it has been found that selected hydroxyl-containing ester or acid waxes may be used in hot melt adhesive compositions, particularly those comprising starch based compositions or graft copolymers of vinyl monomers and polyalkylene oxide polymers to provide compatible compositions with good thermal stability and improved color retention.

More particularly, this invention involves a hot melt adhesive composition comprising:

1) a base polymer selected from the group consisting of:
   a) a starch ester having from about 2 to 18 carbon atoms in the ester component and a degree of substitution (DS) of from about 0.3 to 3.0, and
   b) a graft copolymer of 40 to 85 wt. % of at least one vinyl monomer and 15 to 60 wt. % of at least one polyalkylene oxide polymer having a molecular weight greater than 3000 and a polymerized ethylene oxide content of at least 50% by weight; and 2) a compatibile hydroxyl-containing ester or acid wax having the formula:

$$R(OH)_n COOR^1$$

where R is a hydrocarbon group of 12 to 30 carbons, n is an integer of 2 to 6 and $R^1$ is H, $C_1$ to $C_4$ alkyl group or $(CH_2CH_2O)_x H$ where x is 1 to 4, with the ester or acid wax having a melting point of at least 80° C.

DETAILED DESCRIPTION OF THE INVENTION

The use of waxes in hot melt compositions based on starch have shown significant compatibility and stability problems and also poor color retention. These problems have also been shown to develop but to a lesser extent when waxes have been added to other hot melt formulations such as those comprising graft copolymers of vinyl monomers and polyoxyalkylene oxide polymers. In accordance with this invention, the use of selected hydroxyl-containing ester or acid waxes has been found to overcome these problems and provide compatible hot melt adhesives.

The selected hydroxyl-containing ester or acid wax useful in the hot melt adhesives of this invention has the following formula:

$$R(OH)_n COOR^1 \qquad (1)$$

where R is a hydrocarbon group of 12 to 30, preferably 14 to 20 carbon atoms, n is an integer of 2 to 6, preferably 2 to 3 and $R^1$ is H, $C_1$ to $C_4$ alkyl group or $(CH_2CH_2O)_x H$ where x is 1 to 4, preferably 1 to 2. More particularly, R is a saturated or unsaturated, straight or branch-chain hydrocarbon, preferably saturated hydrocarbon and $R^1$ is a straight or branch-chain alkyl and preferably methyl or ethyl. The hydroxyl groups (OH) in the wax (1) depend from the R group and will be on different carbons (i.e., no more than one OH will depend from a single carbon atom). The wax (1) also has a melting point of at least 80° C. and preferably at least 95° C. and may be as high as about 150° C. Also preferred is the ester or acid wax wherein at least two of the hydroxyl groups are in the vicinal or adjacent position.

The hydroxyl-containing ester or acid waxes (1), may be prepared by reacting a long chain unsaturated acid such as oleic, linoleic, linolenic, palmitoleic and ricinoleic acids, and the esters or glycerides thereof, with potassium hydroxide and potassium permanganate to form the hydroxy substituted acid counterpart. This may be converted into the ester by further reaction with alcohol such as methanol or ethylene glycol in the presence of an acid catalyst.

The waxes 1, as described above, are particularly useful as compatible additives in starch based hot melt adhesive compositions. The starches which have been found especially suitable in hot melt formulations are the modified starch esters disclosed in U.S. Pat. No. 5,360,845 issued Nov. 1, 1994. The starch is an intermediate or high DS starch ester having from about 2 to 18 carbon atoms in the ester component and a degree of substitution (DS) of from about 0.3 to 3.0.

The esterified starch compound described above has the formula:

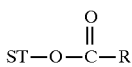

where ST represents the starch base material and R is an alkyl, aryl, alkenyl, alkaryl or aralkyl of 1 to 17, preferably 1 to 6 carbon atoms. More preferably, the ester compound will contain an R group which is an alkyl of 1 to 2 carbon atoms. This starch ester will have a DS of from about 0.3 to 3.0, preferably from about 0.7 to 2.4. The term "degree of substitution" (DS) as used herein indicates the average number of sites per anhydroglucose unit of the starch molecule on which there are substituent units.

The starch esters which are used in the hot melt adhesives of this invention may be prepared from the respective carboxylic acid anhydride or acid chlorides. Typical methods include reactions in aqueous systems and in solvent systems such as pyridine. These and other methods along with an improved method for preparing the intermediate DS starch esters using an aqueous system are disclosed in U.S. Pat. No. 5,360,845 issued on Nov. 1, 1994.

The base starch material used in the starch esters described above, may be any of several starches, native, converted or derivatized. Such starches include those derived from any plant source including corn, potato, wheat, tapioca, rice, sago, waxy maize, sorghum and high amylose starch such as high amylose corn, i.e., starch having at least 45% and more particularly at least 65% by weight of amylose content.

When using the starch ester in the hot melt adhesive formulation, it is desirable to use a diluent that is a non-volatile, polar organic material which is compatible with the starch ester. The diluent will be used in a sufficient amount to allow the formulation to function as a hot melt by melting and forming a homogeneous melt at the application temperature and having a suitable viscosity at that temperature. This means the use of diluent will allow the formulation to melt at the application temperature, i.e., 400° F. (204° C.) or less and also possess the desired viscosity of <50,000 cP at that temperature. A number of materials can be used as the diluent and they may contain one or more polar groups. Particularly useful diluents include those containing sulfonamide, alcohol, amide and ester groups which absorb low levels of moisture at high humidity, i.e., have a moisture content of less than about 20% by weight at 90% relative humidity and 23° C. Preferred diluents are the alcohols or hydroxy containing compounds having low moisture absorption, i.e., hydrophobic alcohols such as the ethoxylates of phenol and bisphenol A, or polyesters of poly(ethylene glycol) and succinic or adipic acid.

The starch esters, method of preparation and the diluents used with them, as described above, are further described in U.S. Pat. No. 5,360,845 issued Nov. 1, 1994 to R. Billmers et al. which is incorporated herein by reference.

In place of the starch esters as the base polymer in the hot melt formulation of this invention, a graft copolymer of a vinyl polymer and polyalkylene oxide may be used. More particularly, a graft copolymer of 40 to 85% by weight of at least one vinyl monomer and 15 to 60% by weight of at least one polyalkylene oxide polymer having a molecular weight greater than 3000 (number average) and a polymerized ethylene oxide content of at least 50% by weight may be used.

The vinyl monomers useful in the above described graft copolymers are preferably selected from the group consisting of vinyl acetate, alkyl-substituted acrylates such as methyl acrylate and ethyl acrylate and mixtures thereof. Other useful vinyl monomers include the alkyl esters of acrylic acid containing 1 to 8 carbon atoms in the alkyl portion and vinyl esters such as vinyl propionate and vinyl butyrate. Vinyl acetate is the preferred vinyl monomer.

The polyalkylene oxide polymers have a molecular weight of about 3000 to 20,000 (number average) and a polymerized ethylene oxide content of at least 50% by weight. The polyalkylene oxide polymers may be homopolymers of ethylene oxide (including the ester and ether derivatives thereof), random copolymers of ethylene and propylene oxide, block copolymers of ethylene and propylene oxide or mixtures thereof.

When using the graft copolymers, described above, in the hot melt adhesive composition of this invention, diluents and other additives may also be used. Diluents such as the non-volatile, polar organic materials, described above for use with the starch ester based compositions, may be used with the graft copolymers. Also diluents such as those described in U.S. Pat. No. 3,891,584, issued Jun. 24, 1975 to D. Ray-Chaudhuri et al., may be used as well as other additives described therein. Further description of the vinyl monomers and polyalkylene oxide polymers as well as diluents and additives can be found in the noted U.S. Pat. No. 3,891,584, which is incorporated herein by reference.

The hot melt adhesive composition of this invention will contain about 10 to 80% by weight of the base or main polymer such as a starch ester or graft copolymer, from about 2 to 25% by weight of the hydroxyl-containing ester or acid wax and from about 0 to 90% by weight of a diluent. Preferably, the hot melt composition will comprise from about 20 to 60% of the main polymer, from about 5 to 20% of ester or acid wax and from about 20 to 75% of diluent. More preferably, the hot melt will comprise from about 40 to 50% by weight of main polymer, from about 5 to 15% by weight of ester or acid wax and from about 35 to 45% by weight of diluent.

The hot melt adhesive composition may additionally include other compatible components such as hydrophilic or hydrophobic thermoplastic polymers, tackifiers and antioxidants. Other additives conventionally used in hot melt adhesives to satisfy different properties and meet specific application requirements may also be added to the composition of this invention. Such additives include plasticizers, fillers, pigments, extending oils, flow modifiers, dyestuffs, etc., as described in the previously noted U.S. Pat. Nos. 3,891,584 and 5,360,845. These amounts can typically vary from about 0 to 50% by weight, and more particularly up to about 30% by weight.

The following examples will further illustrate the embodiments of this invention. In these examples all parts are given by weight and all temperatures in degrees Celsius unless otherwise noted.

EXAMPLE 1

Preparation of erythro 9,10-dihydroxystearic acid was performed as follows. A stirred solution of 211.6 g of KOH was added to 604.5 g of oleic acid in 13 L of tap water. The solution was cooled to 12° C. and 540 g of $KMnO_4$ added with a solid addition funnel over 55 minutes. The mixture was allowed to stir for 130 minutes after the addition was complete, reaction temperature ranged from 12.0° to 13.6° C. Sodium metabisulfite (540 g) was added over 10 minutes and the reaction warmed up to 20° C. (pH 8.2). The pH was lowered to 2.5 with addition of 1100 g of concentrated HCl over 20 minutes. After addition of HCl, the mixture was stirred for 15 minutes, then filtered and washed to give 449.5 g of product with m.p. of 122° to 124° C.

The above prepared product, erythro 9,10-dihydroxystearic acid, was converted to methyl erythro 9,10-dihydroxystearate as follows. A mixture of 550 g of erythro 9,10-dihydroxystearic acid and 13,75 g of Dowex 50 W-X 8H+ (sulfonated polystyrene) in 4200 ml. of methanol was refluxed for 68 hours. The hot solution was decanted, cooled in an ice bath for 4 hours and then filtered and washed with 450 mL of methane to give 434.6 g of product, m.p. 100° to 102° C.

EXAMPLE 2

A hot melt adhesive composition was formulated containing the methyl erythro 9,10 dihydroxystearate prepared in Example 1 in a starch ester based composition. The composition comprised 42 parts of acid hydrolyzed Hylon VII (high amylose corn starch with about 70% amylose content) starch acetate (DS of ~1.5), 48 parts of Macol 206E, an ethoxylated Bisphenol A obtained from PPG/Mazer, 10 parts of the ester wax of this invention, i.e., methyl erythro 9-dihydroxystearate and 0.5 parts of an antioxidant Highpure TNPP (phosphite tesin). The formulated hot melt, Sample A, was then tested for physical properties and compared below in Table 1 with a similar formulation, Sample B, which substituted Paracin 220, N-(2-hydroxyethyl)-12-hydroxystearamide, a wax obtained from Cas Chem, for the ester wax of this invention. The samples were tested using the following procedures.

Viscosity was measured using a Brookfield viscometer (Spindle 27).

Tack and range were measured by drawing out a 3 mil thick adhesive film and qualitatively measuring the tack by determining how many successive finger prints could be made in the film before it set. The range or open time indicates the number of seconds during which the finger prints can be made. Tack is an objective measure of tackiness.

The adhesive was also subjected to peel/shear testing such as is conventionally required in the packaging industry. In the peel temperature test a bead of adhesive approximately ⅛ inch in diameter is applied with a glass rod onto 60 pound/ream Kraft paper. A second sheet of the same paper is superimposed on the first sheet within 2 seconds and pressed thereto to form a kraft to kraft bond. The bonded sheets are then cut perpendicular to the adhesive line into 1 inch wide strips. Duplicate bonded specimens are placed in an oven with one free end of the specimen attached to a fixed support and a 100 gram load suspended from the other sheet at the same end of the bond. The oven temperature is then increased in 10° F. increments at 15 minute intervals. The temperature at which bond delamination occurred is specified as the peel temperature.

In the shear temperature test, samples are prepared as in the peel temperature test, but separate sheets of kraft paper at opposite ends of the bonded specimen are suspended and weighted to stress the bond in a shear mode. The temperature of the oven is increased as in the peel test until failure occurs.

Adhesion was tested in the following manner. A molten bead of hot melt is drawn across the middle (widthwise) of a 1"×3" strip of corrugated board stock. A second strip of corrugated board is then immediately superimposed upon the first and a 100 gram weight placed on top of the construction. The bonds are then aged for 24 hours at room temperature. After aging, the samples are stressed by hand at the temperature noted (0° F., 20° F., 40° F. or room temperature—RT) in a 90° peel mode. The presence of complete fiber tear (FT) indicates excellent adhesion.

Thermal stability was gauged by placing 50 grams of adhesive in a 4 oz. glass jar and covering the jar with aluminum foil. The jar was placed in an oven at the desired temperature. After the duration of the test, the jar was removed from the oven and checked for gelation, surface skin, edge ring and color. The viscosity of the aged sample was also measured and compared to the of the unaged material.

TABLE 1

| | Sample Formulations | |
|---|---|---|
| | A | B |
| Physical Properties | Starch hot melt with ester wax of this invention | Starch hot melt comparison product |
| Tack | moderate | moderate |
| Range (sec) | 3–4 | 3–4 |
| Viscosity @ 275° F. (cP) | 1887 | 1975 |
| Peel (°F., kraft/kraft) | 130 | 130 |
| Shear (°F., kraft/kraft) | 170 | 180 |
| Adhesion (corrugated) | | |
| RT | 100% FT | 100% FT |
| 40° F. | 100% FT | 100% FT |
| 20° F. | 100% FT | 100% FT |
| 0° F. | 100% FT | 90% FT |
| Thermal Stability | | |
| 24 hrs. @ 275° F. | | |
| Color | light tan | light brown |
| Skin/Gel/Edge Ring | none | none |
| Viscosity (% change) | 5.2 | 4.2 |
| 48 hrs. @ 275° F. | | |
| Color | light brown | brown |
| Skin/Gel/Edge Ring | none | none |
| Viscosity (% change) | 7.3 | 9.5 |
| 72 hrs. @ 275° F. | | |
| Color | brown | brown/black |
| Skin/Gel/Edge Ring | none | gelled |
| Viscosity (% change) | 9.95 | n/a |

EXAMPLE 3

A hot melt adhesive composition containing the ester wax additive of Example 1, i.e., methyl erythro 9,10 dihydroxystearate, in a graft copolymer base of vinyl acetate and polyethylene oxide was prepared. One formulation contained 70 parts of the base graft copolymer, 20 parts of a tackifier, Nirez V 2040 (pheonolic resin) and 10 parts of the ester wax of Example 1 (Sample C). This formulation was tested for physical properties and compared with a similar comparison composition containing castor wax in place of the ester wax of this invention (Sample D). Results are shown below in Table 2. The following test procedures were used in addition to those given in Example 2.

Cloud point is determined by heating the adhesive formulation to 175° C. and applying a small bead (approximately 1 gram) of the molten adhesive to the bulb of an ASTM thermometer. The temperature at which the molten adhesive clouds over is then noted. This measure of cloud point provides an indication of the hot melt's overall compatibility, i.e., compatibility of the individual ingredients with each other.

Water dispersibility is determined using the TAPPI UM 666 procedure. This test determines the dispersibility, or quantifies the degree of dispersibility of adhesive in water. The adhesive is prepared by drawing down a coating on a teflon coated sheet (typically a 3 mil coating). The adhesive is chipped or scraped from the teflon sheet and ready for testing. A 1.0 gram sample of adhesive is added to 700 ml of room temperature (RT) distilled water in a blender. Agitation begins at high speed and continues for five minutes. All potential hang ups are loosened with a glass rod during the mixing. At the conclusion of mixing, the adhesive is filtered through a 60 mesh screen that is preweighed. The metal screen is placed in a 177° C. oven and dried to a constant weight. The percent adhesive dispersed is calculated as:

$$\text{Adhesive Dispersed, \%} = \frac{\text{weight of sample-amount retained on screen}}{\text{weight of sample}} \times 100$$

TABLE 2

| | Sample Formulations | |
|---|---|---|
| | C | D |
| | Graft copolymer hot melt | Graft copolymer hot melt |
| Physical Properties | with ester wax | comparison |
| Tack/Range (sec) | 2–3 | 3–4 |
| Cloud Point, °F. | 140 | 240 |
| Ring & Ball Softening Point, °F. | 182 | 185 |
| Viscosity @ 350° F., cP | 752 | 835 |
| Peel, °F. | 100 | 100 |
| Shear, °F. | 130 | 170 |
| Dispersibility 10 min. @ RT, % | 87 | 84 |
| Stability 72 hrs. @ 350° F. | pale yellow no char | light brown slight char |

Another formulation was made containing 70 parts of the graft copolymer described above, 15 parts of the ester wax of the invention (Example 1) and 15 parts of tackifier, Nirez V2150 (phenol resin) (Sample E). This formulation was tested and compared with a similar comparison formulation which substituted Paracin 220, a wax described above, i.e., N-(2-hydroxyethyl)-12-hydroxystearamide, for the wax of this invention (Sample F). Results are shown below in Table 3.

TABLE 3

| | Sample Formulations | |
|---|---|---|
| | E | F |
| | Graft copolymer hot melt | Graft copolymer hot melt |
| Physical Properties | with ester wax | comparison |
| Tack/Range (sec) | 1–2 | 2–3 |
| Cloud Point, °F. | 200 | 270 |
| Ring & Ball Softening Point, °F. | 184 | 270 |
| Viscosity @ 350° F., cP | 637 | 690 |
| Peel, °F. | 130 | 140 |
| Shear, °F. | 160 | 190 |
| Dispersibility 10 min. @ RT, % | 91 | 84 |
| Stability 72 hrs. @ 350° F. | golden yellow no char | brown char |

Paracin wax is the only commercially available wax that is compatible with the polar hot melt formulations of this invention. As shown in the examples, there is an increase in viscosity and undesirable color properties shown in formulations with this material. Use of the waxes of this invention in polar formulations provide improved viscosity over time (stability) and less color formation while also providing a compatible formulation with acceptable levels of adhesion performance.

What is claimed is:

1. A hot melt adhesive composition comprising:
    1) a base polymer selected from the group consisting of:
        a) a starch ester having from about 2 to 18 carbon atoms in the ester component and a degree of substitution (DS) of from about 0,3to 3.0, and
        b) a graft copolymer of 40 to 85% wt. % of at least one vinyl monomer and 15 to 60 wt. % of at least one polyalkylene oxide polymer having a number average molecular weight greater than 3000 and a polymerized ethylene oxide content of at least 50% by weight, and
    2) a compatible hydroxyl-containing ester or acid wax having the formula:

$$R(OH)_n COOR^1$$

where R is a hydrocarbon group of 12 to 30 carbons, n is an integer of 2 to 6 and $R^1$ is H, $C_1$ to $C_4$ alkyl group or $(CH_2CH_2O)_x$ H where x is 1 or 4, with the ester or acid wax having a melting point of at least 80° C.

2. The composition of claim 1 wherein from about 10 to 80% by weight of the base polymer, from about 2 to 25% by weight of the hydroxyl-containing ester or acid wax and from about 0 to 90% by weight of a diluent are used.

3. The composition of claim 2 wherein R in the ester or acid wax is a hydrocarbon of 14 to 20 carbons.

4. The composition of claim 3 wherein n is 2 to 3 and x is 1 to 2.

5. The composition of claim 3 wherein at least two of the hydroxyl groups in the ester or acid wax are in the vicinal position.

6. The composition of claim 3 wherein $R^1$ is methyl or ethyl, n is 2 to 3 and at least two of the hydroxyl groups are in the vicinal position.

7. The composition of claim 2 wherein the base polymer is a starch ester.

8. The composition of claim 7 wherein R in the ester or acid wax is a hydrocarbon of 14 to 20 carbons.

9. The composition of claim 8 wherein at least two of the hydroxyl groups in the ester or acid wax are in the vicinal position.

10. The composition of claim 9 wherein in the ester or acid wax, n is an integer of 2 to 3.

11. The composition of claim 10 wherein the ester or acid wax has a melting point of at least 95° C.

12. The composition of claim 11 wherein the starch ester has an alkyl ester group having a total of 2 to 7 carbon atoms in the ester component.

13. The composition of claim 12 which contains a diluent that is a non-volatile, polar organic material which is compatible with the starch ester.

14. The composition of claim 13 wherein the ester wax is methyl erythro 9,10 -dihydroxystearate.

15. The composition of claim 2 wherein the base polymer is a graft copolymer of a vinyl polymer selected from the group consisting of vinyl acetate, vinyl propionate and vinyl butyrate and an alkyl substituted acrylate having 1 to 8 carbon atoms in the alkyl portion.

16. The composition of claim 15 wherein said polyalkylene oxide polymer is selected from the group consisting of homopolymers of ethylene oxide, random copolymers of ethylene and propylene oxide, block copolymers of ethylene and propylene oxides, and mixtures thereof.

17. The composition of claim 16 wherein R is the ester or acid wax is a hydrocarbon of 14 to 20 carbons.

18. The composition of claim 17 wherein at least two of the hydroxyl groups in the ester or acid wax are in the vicinal position.

19. The composition of claim 18 wherein the ester or acid wax n is an integer of 2 to 3.

20. The composition of claim 19 wherein the ester or acid wax has a melting point of at least 95° C.

* * * * *